United States Patent [19]
Black

[11] 3,815,891

[45] June 11, 1974

[54] JIG FOR POSITIONING THE STUDS FOR THE QUARL TILES

[76] Inventor: William Brown Black, Kilbarchan Rd., Bridge of Weir, Penwold, Renfrewshire, Scotland

[22] Filed: Mar. 5, 1973

[21] Appl. No.: 337,909

[30] Foreign Application Priority Data
May 30, 1972 Great Britain................... 25160/72

[52] U.S. Cl. ................. 269/45, 29/200 P, 228/44, 228/57, 269/52
[51] Int. Cl............................................. B23q 3/18
[58] Field of Search ........ 29/200 J, 200 P; 228/44, 228/57; 269/45, 47, 52

[56] References Cited
UNITED STATES PATENTS
| | | | |
|---|---|---|---|
| 2,399,536 | 4/1946 | Baum............................. | 269/45 X |
| 2,787,234 | 4/1957 | Mach............................. | 269/45 X |
| 2,887,079 | 5/1959 | Wilson........................... | 269/45 X |
| 3,056,369 | 10/1962 | Roth.............................. | 269/45 X |

Primary Examiner—Roy Lake
Assistant Examiner—Mark S. Bicks
Attorney, Agent, or Firm—Young & Thompson

[57] ABSTRACT

For use in the course of forming a venturi-shaped flame-ignition throat in a venturi-shaped duct in a boiler, the jug being used for the positioning of studs for welding to circulation tubes so as to extend from the latter inwards in the direction of the duct axis, the tubes being disposed in banks at each of two diametrically opposed regions of the duct in non-contiguous relationship over the major parts of their lengths with their axes following the curvature of the duct in planes normal or substantially normal to said circulation axis, the jig comprising an internally-braced metal ring of diameter to fit with clearance within the smaller diameter end of either one of the truncated conical lengths of the duct, L-shaped support brackets secured to the external periphery of said ring at circumferentially spaced locations and providing first limbs parallel to the ring axis and outwardly projecting second limbs spaced from and parallel to radii of said ring, the first limbs being adjustable in length and the second limbs having therein elongate holes enabling positional adjustment relative thereto of locating studs welded to the circulation tubes closest to the larger diameter end of said either one truncated conical length of the duct to fix the jig in position, sections of a frusto-conical skirt also secured to the external periphery of the ring and mounting mandrel-guiding tubes whereof, in use, the axes are normal to the axes of other circulaton tubes at said two opposed regions and mandrels insertable through said tubes and having tapped ends into which are adapted to be screwed studs to be welded to said other circulation tubes.

1 Claim, 4 Drawing Figures

PATENTED JUN 11 1974 3,815,891

JIG FOR POSITIONING THE STUDS FOR THE QUARL TILES

This invention relates to a jig for use in the course of forming a venturi-shaped flame-ignition throat in a venturi-shaped duct in a boiler, the jig being used for the positioning of studs for welding to circulation tubes so as to extend from the latter inwards in the direction of the duct axis, the tubes being disposed in banks at each of two diametrically opposed regions of the duct in non-contiguous relationship over the major parts of their lengths with their axes following the curvature of the duct in planes normal or substantially normal to said duct axis. Such a flame-ignition throat and a method of forming same are disclosed in my copending patent application Ser. No. 268,149, now U.S. Pat. No. 3,793,995.

According to the present invention, I provide a jig for use as aforesaid comprising an internally braced metal ring of diameter to fit with clearance within the smaller diameter end of either one of the truncated conical lengths of the duct, L-shaped support brackets secured to the external periphery of said ring at circumferentially spaced locations and providing first limbs parallel to the ring axis and outwardly projecting second limbs spaced from and parallel to radii of said ring, the first limbs being adjustable in length and the second limbs having therein elongate holes enabling positional adjustment relative thereto of locating studs welded to the circulation tubes closest to the larger diameter end of said either one truncated conical length of the duct to fix the jig in position, sections of a frusto-conical skirt also secured to the external periphery of the ring and mounting mandrel-guiding tubes whereof, in use, the axes are normal to the axes of other circulation tubes at said two opposed regions, and mandrels insertable through said tubes and having tapped ends into which are adapted to be screwed studs to be welded to said other circulation tubes.

An embodiment of the invention will now be described, by way of example, with reference to the accompanying drawings, in which.

Figure 1:
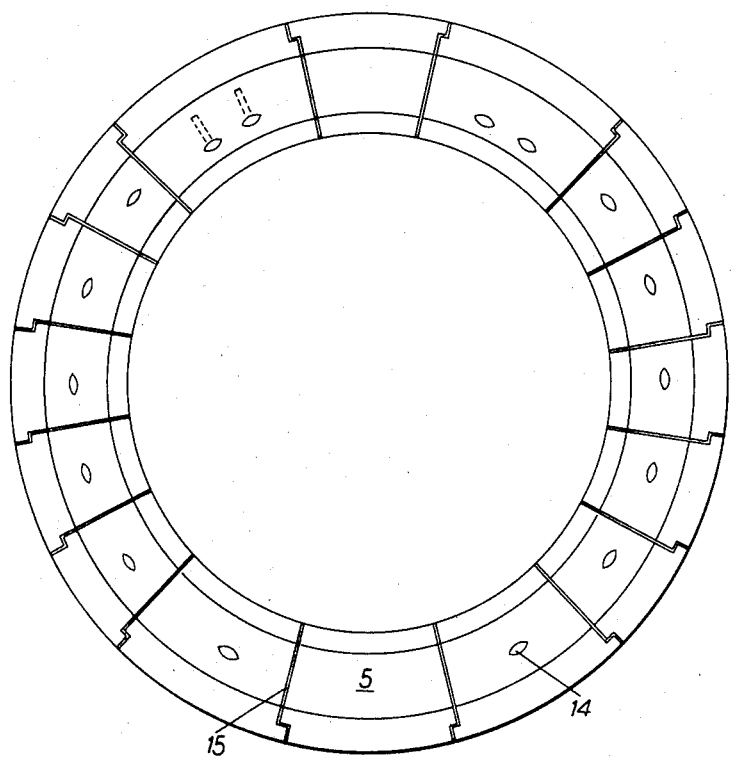
FIG. 1 is an end elevation of a venturi-shaped flame-injection throat formed in a venturi-shaped duct in a boiler, in the course of which forming use is made of a jig according to the invention.
Figure 2:
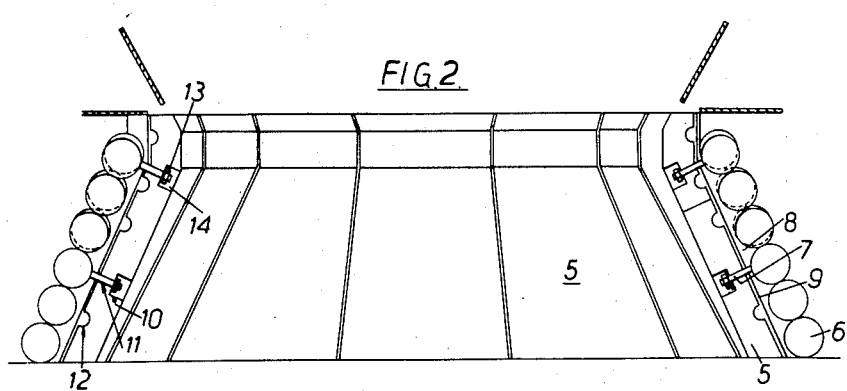
FIG. 2 is a corresponding cross-section.

Referring now to the drawings, and firstly to FIGS. 1 and 2, a venturi-shaped flame-injection throat formed in a venturi-shaped duct in a boiler, is lined by shaped refractory bricks or tiles 5. In the construction of the throat, a backing of refractory cement is formed in the duct, and banks of circulation tubes 6 are disposed diametrically opposed at each side of the duct. The axes of the tubes 6 are in planes normal to or substantially normal to the duct axis and the tubes are out of contact with one another over the major parts of their lengths, coming together only locally where anchorage to the tiles is effected (see FIGS. 2 and 4). Intermediate lengths of the tubes 6 are curved to follow the duct contour, and studs 7 are welded to some of the tubes 6 to extend inwards towards the axis of the duct. Further refractory cement 8 is then applied to completely embed said intermediate lengths of the tubes 6. A refractory bedding cement layer 9 is then applied and the tiles 5 are applied against the layer 9.

The tiles 5 are of silicon carbide and some of them have in their front faces recesses 10 from the centres of the bottoms of which bolt holes 11 extend to the rear faces of the tiles. Adjacent tile edges are complementarily rabbetted to interfit.

The tiles 5 have grooves 12 in their rear faces and these assist in keying the tiles in place. The studs 7 project through the bolt holes 11 and locking nuts 13 are secured thereon where they extend into the recesses 10. The recesses are then filled with silicon carbide cement 14 which is rammed into place until there is a finish flush with the front surfaces of the tiles. Refractory caulking material 15, such as fibrax paper, is filled into the spaces between adjacent tiles 5.

Figure 3:
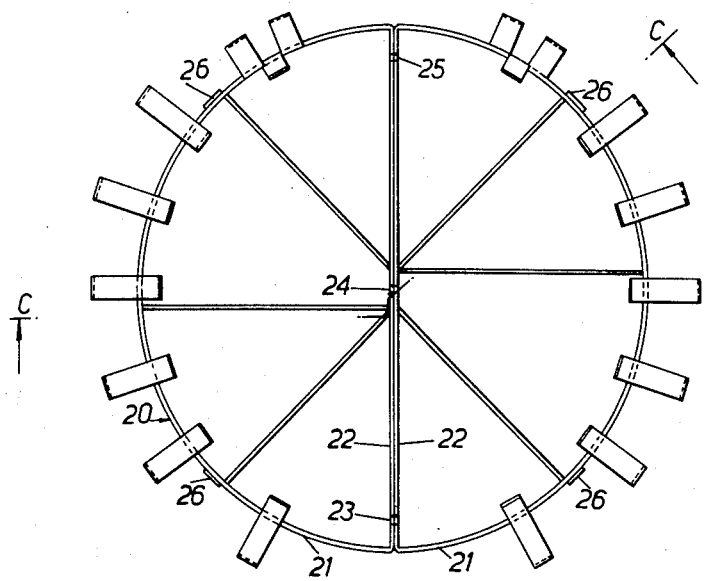
FIG. 3 is an end elevation in the direction of arrow A of FIG. 4 of a jig according to the invention.
Figure 4:
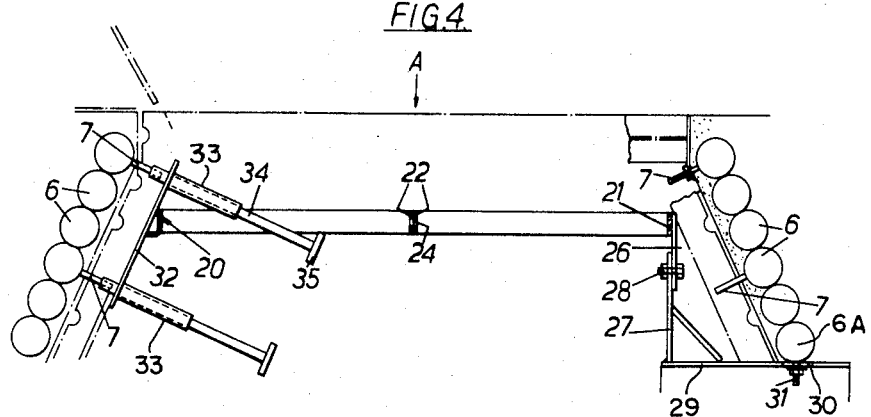
FIG. 4 is a section on the line C—C of FIG. 3.

The present invention is concerned with a jig for positioning the studs 7 for welding to the circulation tubes 6. Referring now to FIGS. 3 and 4, the jig is fabricated from mild steel flats and tubes and comprises an internally braced ring 20 made up of two flats each bent to the shape of a semi-circle 21 with a closed base 22, the two parts being bolted together through aligned bolt holes 23, 24 and 25 in the juxtaposed bases 22, the bolts not being shown. The ring is of diameter to fit with clearance within the smaller diameter end of either one of the truncated conical lengths of the duct.

Support brackets are secured to the ring 20 at 45° centres, the support brackets being L-shaped (see right-hand side of FIG. 4) with first limbs parallel to the axis of the ring and each made up of two parts 26 and 27 secured together by a bolt and nut fastening 28, the bolt hole in the part 26 being elongate and enabling length adjustment of the first limbs. The second limb 29 of each support bracket has an elongate bolt hole 30 enabling positional adjustment of a stud 31 to be welded to circulation tubes 6A of each bank, the tubes 6A being those which are closest to the larger diameter ends of the truncated conical length of the duct. Thus there are four jig-locating studs 31, two welded to each of the two circulation tubes 6A. The sections 32 of a frusto-conical shaped discontinuous skirt are welded to the external periphery of the ring 20, the skirt being similar to but fitting with peripheral clearance within the frusto-conical lengths of the venturi-shaped duct. Mandrel tubes 33 are secured to the inside walls of the skirt sections 32 to extend perpendicularly therefrom, the skirt sections having openings aligned with the bores of the tubes 33. As can be gathered from the left-hand side of FIG. 4, there are two rows of mandrel tubes 33 for each one of the two banks of circulation tubes 6 in the present embodiment, as only two tubes 6 of each bank are to have studs 7 welded thereto. The positions of the mandrel tubes 33 are such that when the jig is properly positioned and secured in position, the axis of each mandrel tube intersects at right angles the axis of a circulation tube to which a stud 7 is to be welded.

Mandrels 34 are sliding fits in the mandrel tubes 33 and are formed at one end with disc-shaped handles 35 and at the other end with tapped holes in which are secured the studs 7 to be welded to the selected circulation tubes 6. The mandrels 34 are pushed until the studs 7 make contact with the circulation tubes 6. The studs are then welded to the tubes and the mandrels are withdrawn. This operation is repeated until all studs 7 have been welded into position and the jig is then removed, the studs 31 finally being sawn off. The applications of the refractory cement 8, refractory bedding cement layer 9 and the quarl bricks or tiles 5 then proceeds.

Profile guages are used to form the bedding cement to a correct truncated conical shape before the bricks or tiles are applied and to check the flare profile of the final throat.

I claim:

1. A jig for use in the course of forming a venturi-shaped flame-ignition throat in a venturi-shaped duct in a boiler, the jig being used for the positioning of studs for welding to circulation tubes so as to extend from the latter inwards in the direction of the duct axis, the tubes being disposed in banks at each of two diametrically opposed regions of the duct in non-contiguous relationship over the major parts of their lengths with their axes following the curvature of the duct in planes normal or substantially normal to said duct axis, said jig comprising an internally braced metal ring of diameter to fit with clearance within the smaller diameter end of either one of the truncated conical lengths of the duct, L-shaped support brackets secured to the external periphery of said ring at circumferentially spaced locations and providing first limbs parallel to the ring axis and outwardly projecting second limbs spaced from and parallel to radii of said ring, the first limbs being adjustable in length and the second limbs having therein elongate holes enabling positional adjustment relative thereto of locating studs welded to the circulation tubes closest to the larger diameter end of said either one truncated conical length of the duct to fix the jig in position, sections of a frusto-conical discontinuous skirt also secured to the external periphery of the ring and mounting mandrel-guiding tubes whereof, in use, the axes are normal to the axes of other of the circulation tubes at said two opposed regions, and mandrels insertable through said tubes and having tapped ends into which are adapted to be screwed studs to be welded to said other circulation tubes.

* * * * *